(12) United States Patent
Arrington, III (10) Patent No.: US 7,784,692 B1
(45) Date of Patent: *Aug. 31, 2010

(54) SINGLE ACCESS VEHICLE

(75) Inventor: Curtis Howell Arrington, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 433 days.

This patent is subject to a terminal disclaimer.

(21) Appl. No.: 11/321,974

(22) Filed: Dec. 29, 2005

(51) Int. Cl.
*G06K 7/08* (2006.01)
*G06K 19/00* (2006.01)
*G06K 19/06* (2006.01)
*G06Q 40/00* (2006.01)
*G07D 11/00* (2006.01)
*G07F 19/00* (2006.01)

(52) U.S. Cl. .............. 235/451; 235/487; 235/492; 235/493; 235/449; 235/379

(58) Field of Classification Search ............... 235/451, 235/487, 492, 493, 449, 379, 380; 705/65, 705/41; 340/572.1, 5.6, 568.7
See application file for complete search history.

(56) References Cited

U.S. PATENT DOCUMENTS

| | | | |
|---|---|---|---|
| 4,614,861 A | | 9/1986 | Pavlov et al. |
| 4,634,848 A | | 1/1987 | Shinohara et al. |
| 4,700,055 A | * | 10/1987 | Kashkashian, Jr. .......... 235/379 |
| 4,736,094 A | * | 4/1988 | Yoshida ....................... 705/41 |
| 4,766,293 A | | 8/1988 | Boston |
| 4,851,650 A | * | 7/1989 | Kitade ......................... 705/44 |
| 5,221,838 A | * | 6/1993 | Gutman et al. ............... 235/379 |
| 5,276,311 A | * | 1/1994 | Hennige ...................... 235/380 |
| 5,326,964 A | * | 7/1994 | Risser ......................... 235/487 |
| 5,530,232 A | | 6/1996 | Taylor |
| 5,578,808 A | * | 11/1996 | Taylor ......................... 235/380 |
| 5,585,787 A | * | 12/1996 | Wallerstein ................. 340/5.42 |
| 5,590,038 A | * | 12/1996 | Pitroda ........................ 705/41 |
| 5,627,355 A | * | 5/1997 | Rahman et al. ............. 235/380 |
| 5,770,843 A | * | 6/1998 | Rose et al. .................. 235/380 |

(Continued)

OTHER PUBLICATIONS

CardWerk Smart Card Solutions, "Smart Card Application," Jacquinot Consulting, Inc., http://www.cardwerk.com/smartcards/smartcard_applications.aspx, 1999 (last modified Jan. 2, 2006), 4 pages.

(Continued)

*Primary Examiner*—Daniel Walsh
(74) *Attorney, Agent, or Firm*—Townsend and Townsend and Crew LLP (57) ABSTRACT

The described embodiments contemplate a system, method, apparatus, and computer-readable medium with computer-executable instructions for accessing multiple accounts. The apparatus may be an interactive access card and/or portable electronic device that includes a memory component for storing data associated with multiple accounts, an input component for selecting an account, and a processing component for retrieving data associated with the selected account. The apparatus also may be an access card that includes a rectangular shaped substrate and an interface component for storing data associated with multiple accounts. The apparatus also may be an electronic reader that includes an interface component for reading an access card, a software component for identifying the accounts stored on the access card, an input component for selecting an account, and a processing component for accessing a database associated with the selected account, transmitting data associated with the selected account, and completing a transaction.

20 Claims, 8 Drawing Sheets

U.S. PATENT DOCUMENTS

| | | | | |
|---|---|---|---|---|
| 5,884,271 | A * | 3/1999 | Pitroda | 705/1 |
| 5,955,961 | A * | 9/1999 | Wallerstein | 340/5.4 |
| 5,962,831 | A * | 10/1999 | Byrley | 235/380 |
| 6,024,286 | A * | 2/2000 | Bradley et al. | 235/492 |
| 6,168,083 | B1 | 1/2001 | Berger et al. | |
| 6,308,890 | B1 | 10/2001 | Cooper | |
| 6,315,195 | B1 * | 11/2001 | Ramachandran | 235/380 |
| 6,358,811 | B1 * | 3/2002 | Kim | 705/40 |
| 6,402,029 | B1 | 6/2002 | Gangi | |
| 6,467,691 | B1 * | 10/2002 | Green | 235/487 |
| 6,685,088 | B1 * | 2/2004 | Royer et al. | 235/380 |
| 6,764,005 | B2 | 7/2004 | Cooper | |
| 6,905,072 | B2 | 6/2005 | Ramachandran | |
| 6,925,439 | B1 * | 8/2005 | Pitroda | 705/1 |
| 7,028,897 | B2 | 4/2006 | Fernandes et al. | |
| 7,044,394 | B2 | 5/2006 | Brown | |
| 7,140,550 | B2 * | 11/2006 | Ramachandran | 235/493 |
| 7,328,844 | B2 * | 2/2008 | Workens | 235/451 |
| 7,337,326 | B2 | 2/2008 | Palmer et al. | |
| 7,512,566 | B1 * | 3/2009 | Fellner | 705/67 |
| 7,513,414 | B1 * | 4/2009 | Block et al. | 235/379 |
| 7,516,881 | B1 * | 4/2009 | Block et al. | 235/379 |
| 7,578,431 | B2 | 8/2009 | Tanner et al. | |
| 7,594,611 | B1 * | 9/2009 | Arrington, III | 235/487 |
| 7,600,673 | B2 * | 10/2009 | Stoutenburg et al. | 235/380 |
| 7,627,531 | B2 * | 12/2009 | Breck et al. | 705/65 |
| 7,661,590 | B1 * | 2/2010 | Gatto | 235/384 |
| 7,665,656 | B2 * | 2/2010 | Gatto | 235/379 |
| 2001/0013551 | A1 * | 8/2001 | Ramachandran | 235/472.02 |
| 2001/0051923 | A1 * | 12/2001 | Kosuda | 705/43 |
| 2002/0003169 | A1 | 1/2002 | Cooper | |
| 2002/0010650 | A1 | 1/2002 | Herzog von Wuerttemberg et al. | |
| 2002/0029191 | A1 | 3/2002 | Ishibashi et al. | |
| 2002/0096570 | A1 * | 7/2002 | Wong et al. | 235/494 |
| 2002/0174016 | A1 * | 11/2002 | Cuervo | 705/16 |
| 2002/0185543 | A1 * | 12/2002 | Pentz et al. | 235/493 |
| 2003/0061157 | A1 | 3/2003 | Hirka et al. | |
| 2003/0080185 | A1 * | 5/2003 | Werther | 235/380 |
| 2003/0111527 | A1 * | 6/2003 | Blossom | 235/380 |
| 2003/0149661 | A1 * | 8/2003 | Mitchell et al. | 705/39 |
| 2003/0187787 | A1 | 10/2003 | Freund | |
| 2003/0208443 | A1 | 11/2003 | Mersky | |
| 2003/0209599 | A1 * | 11/2003 | Gatto | 235/379 |
| 2003/0226041 | A1 * | 12/2003 | Palmer et al. | |
| 2003/0233557 | A1 * | 12/2003 | Zimmerman | 713/186 |
| 2004/0010462 | A1 | 1/2004 | Moon et al. | |
| 2004/0084524 | A1 * | 5/2004 | Ramachandran | 235/380 |
| 2004/0124246 | A1 | 7/2004 | Allen et al. | |
| 2004/0155101 | A1 * | 8/2004 | Royer et al. | 235/379 |
| 2004/0195315 | A1 * | 10/2004 | Workens | 235/380 |
| 2004/0238620 | A1 | 12/2004 | Cohagan et al. | |
| 2004/0249749 | A1 * | 12/2004 | Strayer et al. | 705/39 |
| 2004/0267664 | A1 * | 12/2004 | Nam et al. | 705/41 |
| 2005/0092844 | A1 | 5/2005 | Zhang | |
| 2005/0125343 | A1 * | 6/2005 | Mendelovich | 705/39 |
| 2005/0127156 | A1 | 6/2005 | Yoo et al. | |
| 2005/0194450 | A1 | 9/2005 | Webb et al. | |
| 2005/0216424 | A1 | 9/2005 | Gandre et al. | |
| 2005/0234778 | A1 * | 10/2005 | Sperduti et al. | 705/22 |
| 2005/0242921 | A1 | 11/2005 | Zimmerman et al. | |
| 2006/0004655 | A1 | 1/2006 | Alexander et al. | |
| 2006/0031173 | A1 | 2/2006 | Rajaram | |
| 2006/0038014 | A1 | 2/2006 | Mann et al. | |
| 2006/0076421 | A1 | 4/2006 | Sato | |
| 2006/0085333 | A1 * | 4/2006 | Wah et al. | 705/40 |
| 2006/0091223 | A1 | 5/2006 | Zellner et al. | |
| 2006/0124756 | A1 | 6/2006 | Brown | |
| 2006/0249574 | A1 * | 11/2006 | Brown et al. | 235/380 |
| 2007/0057038 | A1 * | 3/2007 | Gannon | 235/380 |
| 2007/0080211 | A1 * | 4/2007 | Chen | 235/380 |
| 2007/0138299 | A1 | 6/2007 | Mitra | |
| 2007/0200684 | A1 | 8/2007 | Colby | |
| 2008/0017704 | A1 * | 1/2008 | VanDeburg et al. | 235/380 |
| 2008/0054081 | A1 * | 3/2008 | Mullen | 235/494 |
| 2008/0061148 | A1 * | 3/2008 | Tanner | 235/492 |
| 2008/0126212 | A1 * | 5/2008 | Cox | 705/17 |
| 2008/0149735 | A1 | 6/2008 | Kozlay | |
| 2008/0201265 | A1 | 8/2008 | Hewton | |

OTHER PUBLICATIONS

Metavante, "Metavante Healthcare Payment Solutions," America's Health Insurance Plans (AHIP), http://www.ahip.org/SupportingOrg/PartnerDetails.aspx?SOPartnerID=190 , 2001, 1 page.

Sun Microsystems, Inc., "Java Card Technology Overview," http://java.sun.com/products/javacard/overview.html, 1994, 3 pages.

* cited by examiner

SINGLE ACCESS VEHICLE

CROSS REFERENCE TO RELATED APPLICATIONS

This application is related by subject matter to the inventions disclosed in the following commonly assigned applications, the entireties of which are hereby incorporated by reference herein: U.S. patent application Ser. No. 11/321,847, filed Dec. 29, 2005, U.S. patent application Ser. No. 11/321,560, filed Dec. 29, 2005, U.S. patent application Ser. No. 11/321,972, filed Dec. 29, 2005, and U.S. patent application Ser. No. 11/626,179, filed Jan. 23, 2007, which is a continuation of U.S. patent application Ser. No. 11/321,847.

BACKGROUND

Automated Teller Machine (ATM) cards, credit cards and debits cards typically provide a safe and convenient method for an individual to access cash and purchase goods and/or services. To use an ATM card, for example, the individual typically opens a savings account, checking account, and the like, at a financial institution and deposit funds, which are then available for later withdrawal. To withdraw cash from the account, the individual (i.e., the account owner) typically goes to a conveniently located ATM or other similar machine and inserts the ATM card into the ATM, which may then read the account information stored on a magnetic stripe on the ATM card. The ATM may ask the account owner to enter a personal identification number (PIN) as a security precaution. The account owner may then specify an amount to be withdrawn. The ATM typically verifies the transaction by making sure the PIN is correct and that there are sufficient funds available to complete the transaction. Once the verification is complete, the ATM may dispense the cash to the account owner.

Debit cards may permit an individual to pay for goods and/or services with funds withdrawn directly from an account, such as a savings and/or checking account. Credit cards, on the other hand, may allow the individual to pay for goods and/or services using a line of credit. To use a debit card, the individual usually must open a savings account, checking account, and the like, at a financial institution and deposit funds. The individual (i.e., account owner) may then present the debit card at the point of sale. The debit card may be interfaced with a payment terminal, which may read account information stored on a magnetic stripe on the debit card. Similar to an ATM card, the account owner may be asked to enter a PIN. The payment terminal may then verify the transaction by making sure the PIN is correct and that there are sufficient funds available to complete the transaction. If the transaction is approved, the sale is completed and the funds may be withdrawn from the account.

ATM cards, debit cards, credit cards, and the like are often advantageous because such cards facilitate secure transactions by limiting unauthorized access to funds through the use of certain security features, such as a signature and/or PIN, and by minimizing the amount of cash that an individual must keep on hand. While cash is usually considered the most liquid type of asset, cash may also be the least secure because cash is typically freely transferable. The owner and possessor of cash is most often the same individual. Because cash is freely transferable, cash that is lost or stolen usually cannot be recovered. Therefore, the risks associated with cash transactions are often unacceptable, particularly with respect to transactions not conducted in person (e.g., by mail, over the internet, etc.) and/or involving large sums of money. ATM cards, debit cards and credit cards, on the other hand, often provide more security. For example, ATM cards enable an account owner to access cash when the account owner needs it. This usually minimizes the amount of cash that the account owner must withdraw and carry at any one time. Debit cards and credit cards, meanwhile, facilitate cashless transactions, which also may minimize the amount of cash that must be carried. In addition, such cards limit access to the funds available in the account by requiring that the account owner's identity be authenticated via a signature and/or PIN. These safeguards help to reduce the risk that cash will be lost and/or stolen.

Cash may have other disadvantages as well. For example, because cash is freely transferable, there may be little or no verifiable transaction history. It is often desirable for a payor (e.g., account owner) and/or payee (e.g., merchant) to have physical proof that a particular transaction took place. This typically requires that the payor receive a receipt. However, receipts may contain errors and can be easily misplaced. In contrast, a financial institution processing a debit card and/or credit card transaction will ordinarily create a transaction history, which may include the identity of the payee, the amount to be paid, the date of the payment, and the signature of the payor. This enables both the payor and payee to independently verify the accuracy of most transactions involving a payment by debit card and/or credit card.

While ATM cards, debit cards and credit cards may provide convenience and security, the proliferation of various types of cards in recent years has forced individuals to carry an ever increasing number of cards. For example, in addition to carrying an ATM card, debit card and credit card, an individual may also carry a driver's license, retailer cards (e.g., cards that provide consumer rewards and/or discounts on purchases at a specific retailer), health insurance cards, employee identification cards, video store cards, and the like. Furthermore, the individual may hold credit accounts with multiple credit card companies, each issuing its own specific card. The large number of cards typically means that individuals can no longer carry, much less keep track of, all the various cards. This has the potential to increase the risk that the cards will be lost and/or stolen. Worse yet, any loss may go undetected by the account owner. This, in turn, may increase the risk that the account owner will become a victim of fraud and/or identity theft.

In addition, a standard system for reading and authenticating card-based transactions has become well established. This is generally beneficial for card holders because it helps to ensure that the same credit card, for example, may be used to purchase a variety a goods and/or services, from a variety of sellers, at a variety of geographical locations. However, this standardization often poses challenges to improving the payment system because any changes may result in cost-prohibitive modifications to the existing card-based payment infrastructure. Thus, it would be advantageous to enable an individual to access multiple accounts without requiring the individual to carry a separate card for each individual account. Furthermore, it would be advantageous to enable convenient access to multiple accounts without requiring significant changes to the existing payment infrastructure.

SUMMARY

The described embodiments contemplate a system, method, apparatus, and computer-readable medium with computer-executable instructions for accessing multiple accounts. In one embodiment, the apparatus may be an interactive access card that includes a memory component for storing data associated with multiple accounts, an input component for selecting an account, and a processing component for retrieving second data associated with the selected account. The interactive access card also may include an interface component for enabling access to the data associated with the selected account.

In another embodiment, the apparatus may be a portable electronic device that includes a memory component for storing data associated with multiple accounts, an input component for selecting an account, and a processing component for retrieving second data associated with the selected account. The portable electronic device also may include an encoding component for transferring the data associated with the selected account to an interface component located on an access card.

In another embodiment, the apparatus may be an access card that includes a rectangular shaped substrate and an interface component located on the substrate for storing data associated with multiple accounts. The data may be read by an electronic reader, which may include software for identifying the multiple accounts stored on the access card.

In another embodiment, the apparatus may be an electronic reader that includes an interface component for reading an access card that is capable of storing data associated with multiple accounts, a software component for identifying the accounts stored on the access card, an input component for selecting an account, and a processing component for accessing a database associated with the selected account via a communications network, transmitting second data associated with the selected account, and completing a transaction with the selected account.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
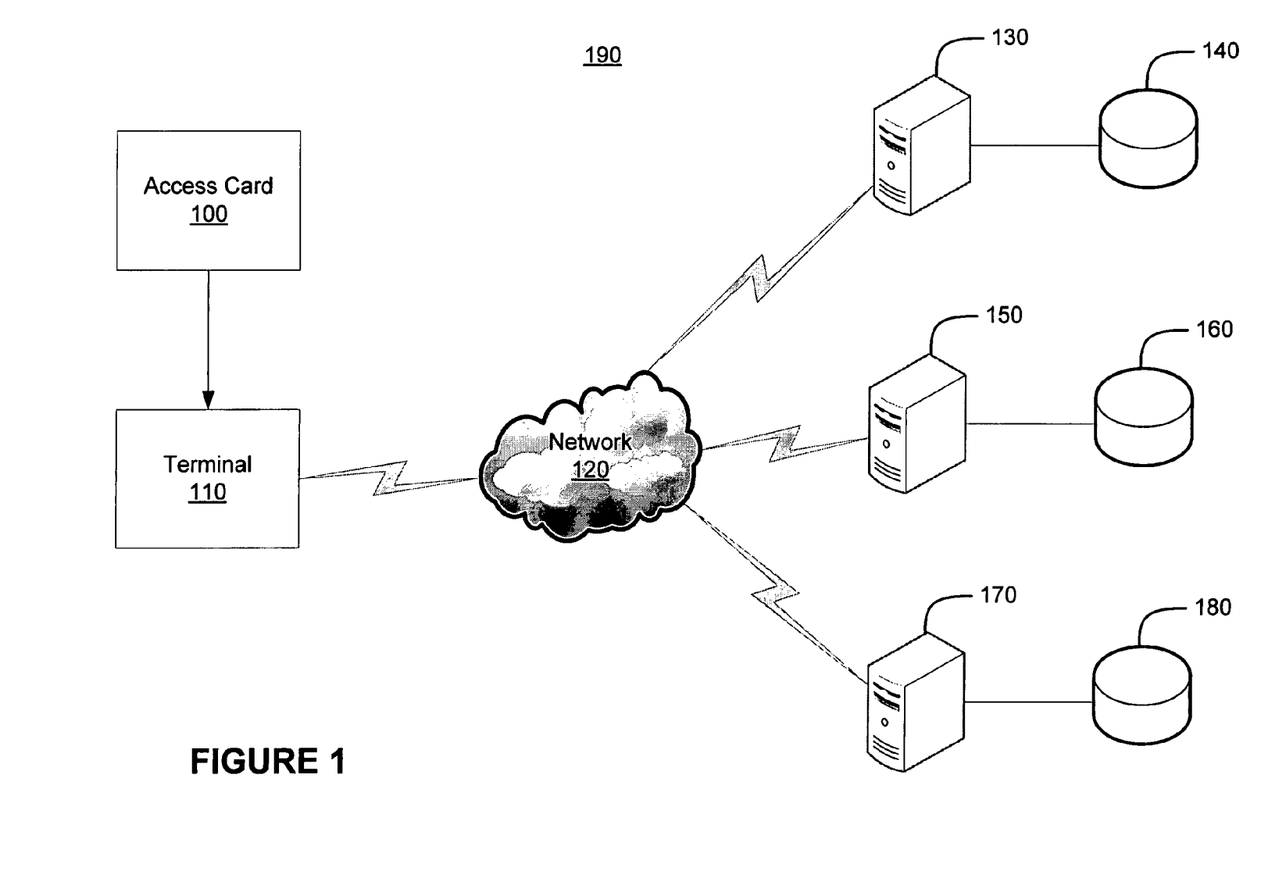
FIG. 1 is a diagram illustrating an example system in which aspects of the invention may be incorporated.

FIG. 1 illustrates an example system in which the present invention may be employed. Of course, actual network and database environments may be arranged in a variety of configurations; however, the example environment shown here provides a framework for understanding the type of environment in which an embodiment may operate.

As shown in FIG. 1, system 190 may include access card 100, terminal 110, network 120, server computers 130, 150 and 170 and databases 140, 160 and 180. An account owner (not shown) may present access card 100 to terminal 110 in order to complete a transaction and/or withdraw money. Access card 100 may include any type of card capable of storing account information. The account information may be stored on a magnetic stripe, for example. The account information may enable the account owner to withdraw cash and/or complete a transaction using funds from the account. Terminal 110 may include any type of electronic reader that is capable of reading account information on access card 100 and processing the transaction. For example, terminal 100 may include an automated teller machine (ATM) and/or electronic reader located at a point-of-sale (e.g., the checkout counter). Terminal 100 may read and send the account information, which may consist of an account number, name of account owner, bank number and/or expiration date, to server computers 130, 150 and/or 170 via network 120, which may include an intranet, the Internet, a local area network (LAN), a wide area network (WAN), a public switched telephone network (PSTN), a cellular network, a radio network, and the like. Server computers 130, 150 and 170 may be owned and/or operated by the owner of terminal 110 (e.g., a bank) or by an acquirer. An acquirer usually is an organization that collects card-based transaction requests and facilitates the authentication process.

Server computer 150 may authenticate the transaction by accessing database 160. Server computer 150 may provide management of database 160 by way of database server system software. As such, server computer 150 may act as a storehouse of data from a variety of data sources and provides that data to a variety of data consumers. Additionally, server computer 150 may authenticate the transaction by accessing server computers 130 and 170 via network 120. Server computer 150 may authenticate the transaction by validating information such as a merchant identification number, an account number, a personal identification number, a bank number, a card expiration date, an account limit, and the like. Once the transaction is authenticated, server computer 150 may send a notice to terminal 110 approving the transaction.

It will be appreciated that the preceding examples are for purposes of illustration and explanation only, and that an embodiment is not limited to such examples. For example, server computer 150 is not limited to database 160 but may be connected to numerous databases, each containing various types of information. Furthermore, terminal 110 may process the transaction by communicating with other servers, such as server computers 130 and/or 170.

Figure 2A:
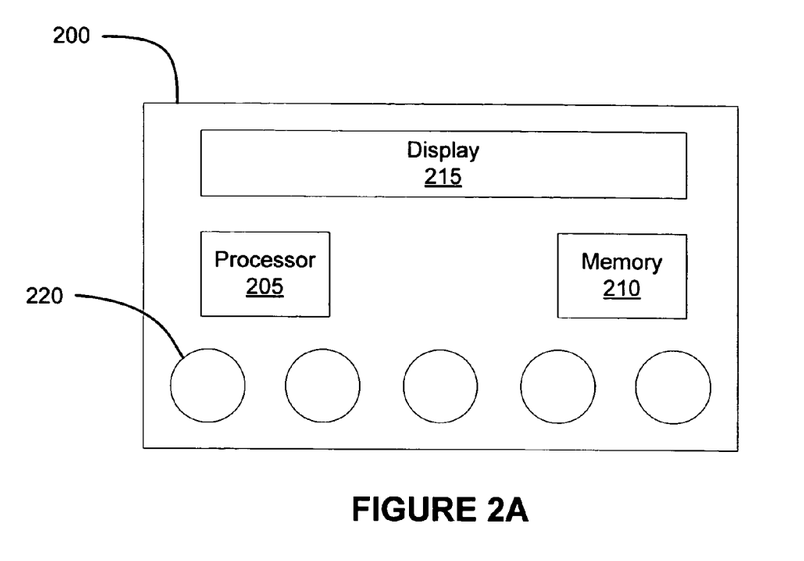
FIGS. 2A and 2B are diagrams illustrating an interactive access card for accessing more than one account.
Figure 2B:
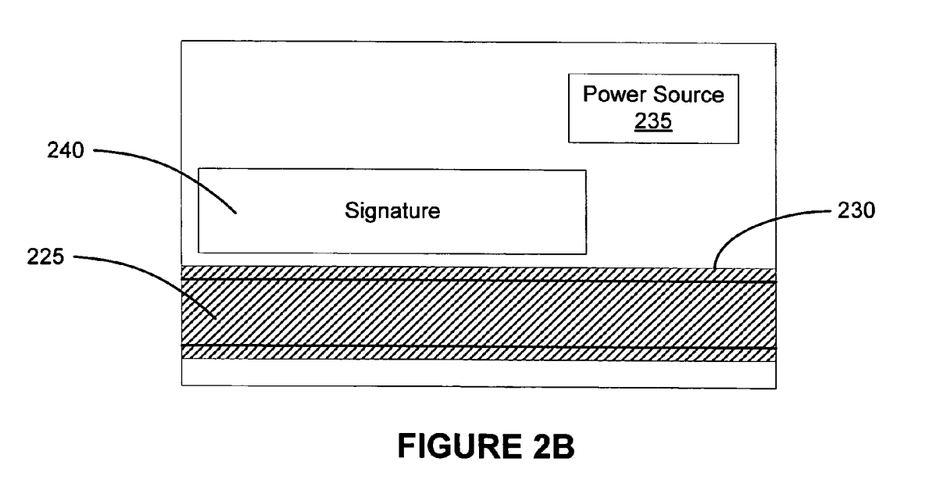

FIGS. 2A and 2B illustrate an interactive access card for accessing more than one account. As shown in FIG. 2A, one side of interactive access card 200 is depicted. Interactive access card 200 may consist of a rectangular shaped substrate. In addition, interactive access card 200 may include processor 205, memory 210, display 215, input device 220 and a system bus (not shown). As shown in FIG. 2B, an opposite side of interactive access card 200 is depicted. Interactive access card 200 also may include interface device 225, encoding device 230, power source 235, and signature field 240.

Processor 205 may include any appropriate processor capable of accessing, executing, and/or transferring data associated with a selected account. The system bus may couple various system components including processor 205 to memory 210, display 215, interface device 225, encoding device 230 and power source 235. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Memory 210 may include computer storage media in the form of volatile and/or nonvolatile memory such as read only memory (ROM) and random access memory (RAM). A basic input/output system (BIOS), containing the basic routines that help to transfer information between elements within interactive access card 200 is typically stored in ROM. RAM typically contains data (e.g., data associated with the selected account) and/or program modules that are immediately accessible to and/or presently being operated on by processor 205.

Display 215 may include any appropriate display device for rendering video, images and/or text. For example, display 120 may include a liquid crystal display (LCD), a plasma display, a light emitting diode (LED) display, and the like. Input device 220 may include any type of device for inputting information, such as a keypad, contact and/or button, and may correspond to numbers, letters, symbols, and the like. Input device may enable an account owner to select accounts and/or input other information such as a personal identification number. Power source 235 may include any component capable of supplying DC power to processor 205, memory 210, display, 215, interface device 225 and encoding device 230. For example, power source 235 may include a DC battery and/or photovoltaic solar cells. In addition, power source 235 may include passive components, such as a wire capable of inducing a voltage when passed through a magnetic field.

Interface device 225 may be any appropriate device for enabling access to data associated with a selected account. For example, interface device 225 may include a magnetic stripe. The magnetic stripe is often made up of iron-based magnetic particles embedded in a plastic-like film. Each particle may include a bar magnet that typically reaches approximately twenty-millionths of an inch in length. Data may be encoded on the magnetic stripe by magnetizing the bar magnets such that the bar magnets are oriented in either a north or south direction. The bar magnets may be magnetized via encoding device 230. Encoding device 230 may include an electromagnetic writer for applying a magnetic flux to the magnetic stripe. As the magnetic flux is applied to the stripe, the corresponding bar magnets assume either a north or south orientation. Once the magnetic flux is removed, the bar magnets usually retain their orientation. This is just one example of encoding data on the magnetic stripe. Other methods may be employed while remaining consistent with an embodiment.

The magnetic stripe may include three tracks, each about one-tenth of an inch in height. Data is typically encoded onto each track according to International Organization for Standardization (ISO) standard 7811. For example, track 1 may have a recording density of 210 bits per inch (bpi) and store up to 79 alphanumeric characters. Track 2 may have a recording density of 75 bpi and store up to 40 numeric characters. Track 3 may have a recording density of 210 bpi and store up to 107 characters.

Interface device 225 also may include a radio frequency (RF) emitter, such as a radio frequency identification (RFID) chip. Processor 205 may be in communication with and transfer data to the RFID chip. The RFID chip may encrypt and emit the data at a predetermined frequency. The data may then be received by any terminal capable of receiving the data at the predetermined frequency when interactive access card 200 is within a predetermined range of the terminal. It will be appreciated that the data may be emitted at any frequency and at any range while remaining consistent with an embodiment.

Figure 2C:
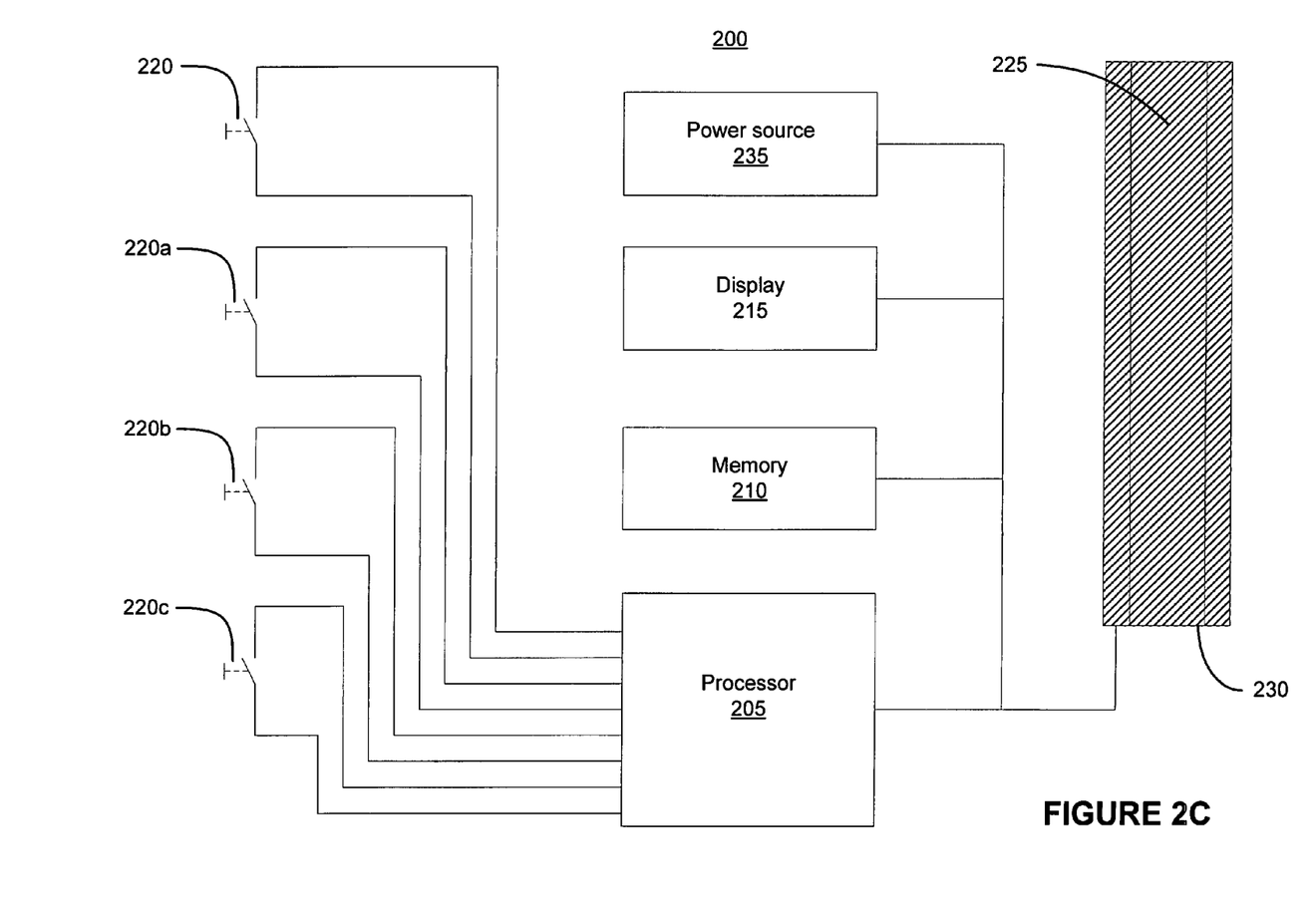
FIG. 2C is a diagram illustrating an implementation of an interactive access card.

FIG. 2C illustrates an implementation of interactive access card 200. Input devices 220-220c may be coupled to processor 205. Processor 205, in turn, may be coupled to memory 210, display device 215, interface device 225, encoding device 230 and power source 235. In one embodiment, an account owner may wish to complete a transaction using a specific account stored in memory 210. Memory 210 may store data associated with multiple accounts, such as a savings account, checking account and/or credit card account. The stored data may include account numbers, bank numbers, type of accounts, name of the account owner(s) and expiration dates. The account owner may select the account using at least one of input devices 220-220c. A signal may be sent to processor 205, which may retrieve data associated with the selected account from memory 210. Processor 205 may then send a signal to display device 215 to display some or all of the data to identify the selected account to the account owner. Processor 205 also may transfer the data to interface device 225. For example, if interface device 225 includes a magnetic stripe, processor 205 may instruct encoding device 230 to apply a magnetic flux to the magnetic stripe, thereby encoding the data associated with the selected account. If interface device 225 includes an RFID chip, the transferred data may be encrypted and emitted at a predetermined frequency.

Once the data associated with the selected account has been transferred to interface device 225, the account owner may present interactive access card 200 to any terminal capable of processing the transaction. It will be appreciated that by transferring specific account information to interface device 225 prior to completing a transaction, interactive access card 200 may be compatible with most existing terminals. For example, if the account owner wishes to withdraw cash from a savings account, the account owner may select the savings account using input devices 220-220c. As noted above, data associated with the savings account may be displayed and/or transferred to interface device 225. The account owner may then present interactive access card 200 to any terminal capable of executing the withdrawal, such as an automated teller machine (ATM). The ATM may read and/or receive the data on interactive access card 200 and request that the account owner enter a personal identification number (PIN). The ATM may authenticate the transaction by sending the data associated with the savings account and PIN to a database and/or service provider (e.g., an acquirer) via a communications network. Once the transaction has been authenticated, the ATM may be instructed to dispense the appropriate amount of cash to the account owner.

In another embodiment, interactive access card 200 may include security features that prevent unauthorized individuals from using the card. For example, prior to using interactive access card 200, a user may be required to input a personal identifier, such as password, PIN, biometric information, and the like. A biometric identification system accepts unique biometric information from a user (e.g., fingerprint, iris scan, etc.) and identifies the user by matching the information against information belonging to registered users of the system. If the user of interactive access card 200 is unable to input the proper identifier, processor 205 may not transfer data to interface device 225.

In addition, processor 205 may include software instructions for erasing data currently encoded and/or stored on interface device 225. For example, processor 205 may include software instructions for erasing data periodically (e.g., thirty minutes after an account has been selected and encoded onto interface device 225, every twenty-four hours, etc.) and/or after a predetermined number of unauthorized access attempts have occurred. Processor 205 also may include software instructions for erasing data upon receiving a request from the user via input devices 220-220c. Thus, the user (e.g., account owner) may be able to select and use an account to complete a transaction but the account information may remain on interface device 225 only for a finite period of time, thereby significantly reducing the possibility that the card could be used for fraudulent purposes if the card were lost and/or stolen.

It will be appreciated that the preceding examples are for purposes of illustration and explanation only, and that an embodiment is not limited to such examples. For example, interactive access card 200 may not have display 215. Furthermore, interactive access card 200 may include more than one type of interface device on a single card (e.g., may include both a magnetic stripe and a RF emitter). Thus, interactive access card 200 may be used at terminals capable of reading data encoded on a magnetic stripe, terminals capable of receiving data via an RF transmission, and/or terminals capable of both.

Figure 3A:
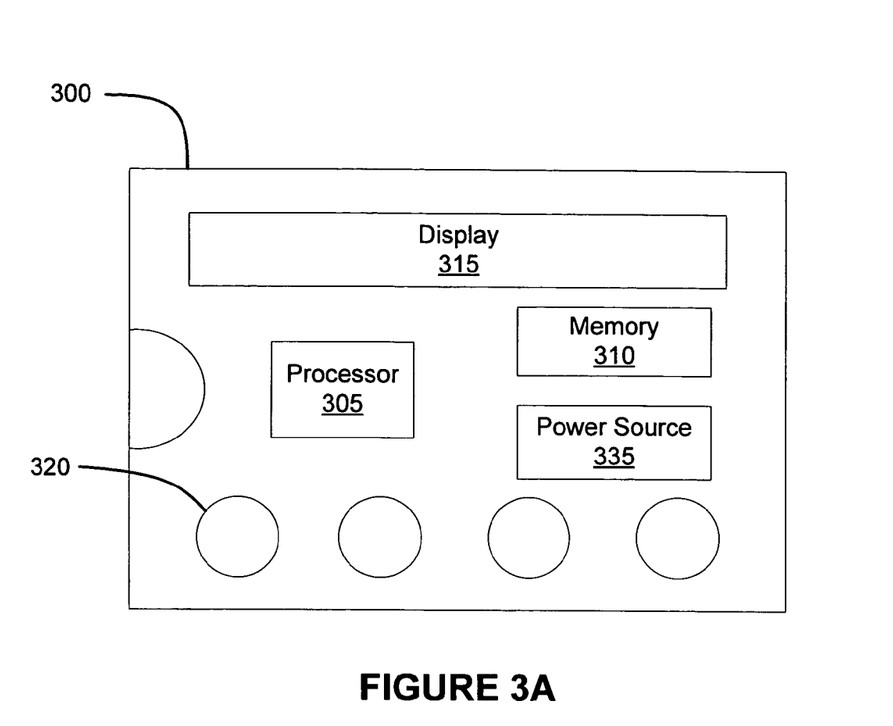
FIGS. 3A and 3B are diagrams illustrating a portable electronic device for accessing more than one account.
Figure 3B:
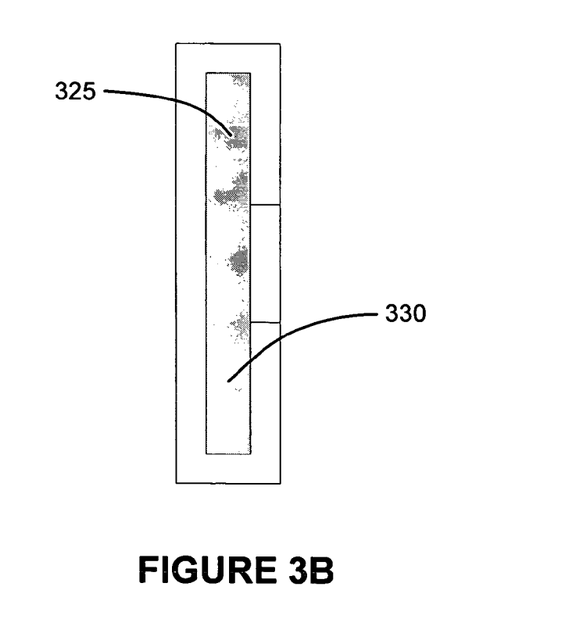

FIGS. 3A and 3B illustrate a portable electronic device for accessing more than one account. As shown in FIG. 3A, one side of portable electronic device 300 is depicted. Portable electronic device 300 may include processor 305, memory 310, display device 315 and input 320. As shown in FIG. 3B, a side view of portable electronic device 300 is depicted. Portable electronic device 300 may include slot 325 for receiving common types of access cards, such as ATM and/or credit cards, and encoding device 330 for encoding data associated with a selected account onto a interface component located on the access card.

Figure 3C:
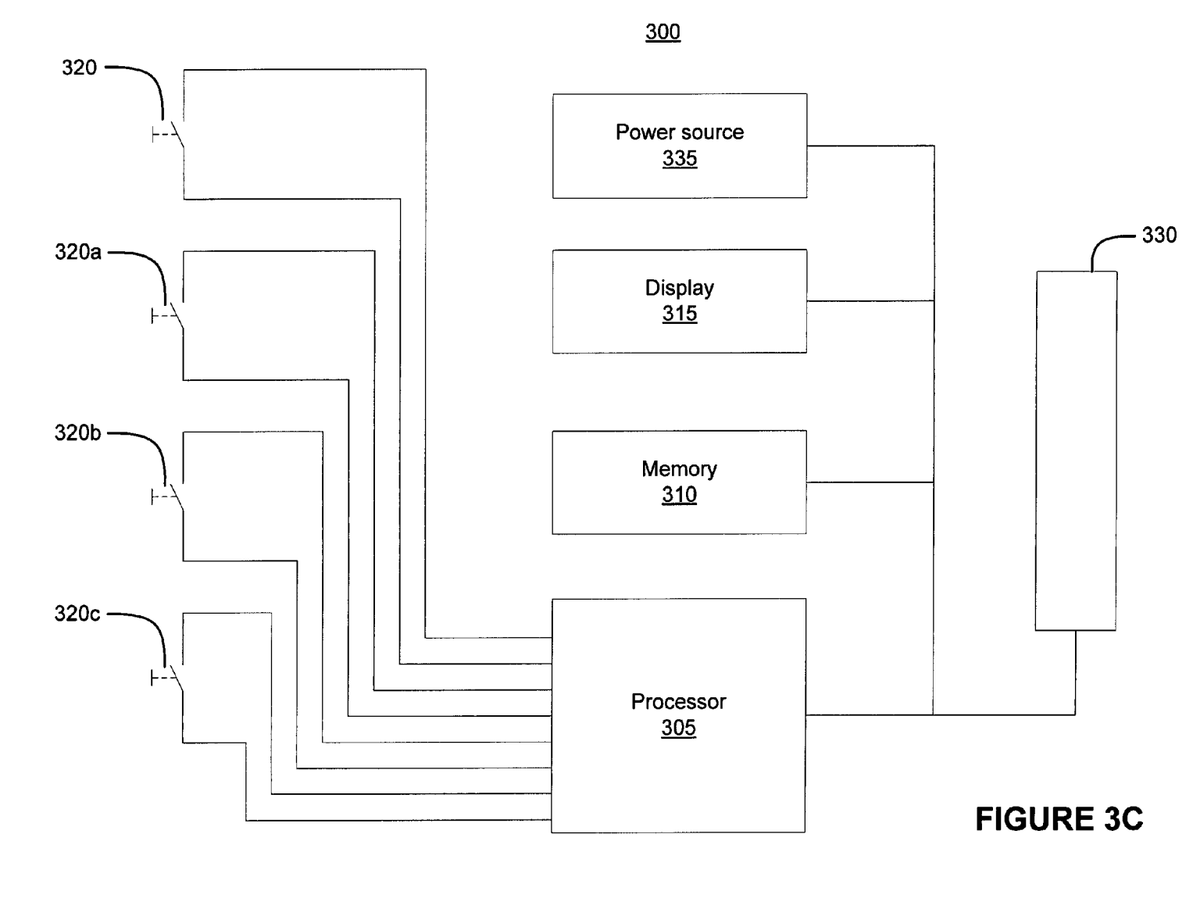
FIG. 3C is a diagram illustrating an implementation of a portable electronic device for accessing more than one account.

FIG. 3C illustrates an implementation of portable electronic device 300. Input devices 320-320c may be coupled to processor 305. Processor 305, in turn, may be coupled to memory 310, display device 315, encoding device 330 and power source 335. In one embodiment, an account owner may wish to complete a transaction using a specific account stored in memory 310. Memory 310 may store data associated with multiple accounts, such as a savings account, checking account and credit card account. The stored data may include account numbers, bank numbers, type of accounts, name of the account owner(s) and expiration dates. The account owner may select the account using at least one of input devices 320-320c. A signal may be sent to processor 305, which may retrieve data associated with the selected account from memory 310. Processor 305 may then send a signal to display device 315 to display some or all of the data to identify the selected account to the account owner. Processor 305 also may transfer the data to an interface device located on an access card using encoding device 330.

Once the data associated with the selected account has been encoded onto the interface device of the access card, the account owner may present the access card to any terminal capable of processing the transaction. For example, if the account owner wishes to purchase goods using a credit card account, the account owner may insert the access card into slot 325 and select the credit card account using input devices 320-320c on portable electronic device 300. As noted above, data associated with the credit card account may be displayed on display device 315 and/or encoded onto the interface device of the access card. The account owner may then present the access card to any terminal capable of completing the transaction, such as an electronic reader at a merchant's checkout counter. The electronic reader may read the encoded data on the access card and authenticate the transaction by sending the data associated with the credit card account to a database and/or service provider (e.g., an acquirer) via a communications network. Once the transaction has been authenticated, the electronic reader may instruct a person (e.g., a cashier) and/or a machine (e.g., a cash register) to complete the transaction.

Portable electronic device 300 also may include security features for preventing unauthorized individuals from using the device. Such features may be the same and/or similar to the security features noted above. For example, a user may be required to input a personal identifier, such as password, PIN, biometric information, and the like before using portable electronic device 300. It will also be appreciated that portable electronic device 300 may be compatible with access cards utilizing more than one type of interface device, such as access cards with both a magnetic stripe and a RF emitter.

Figure 4A:
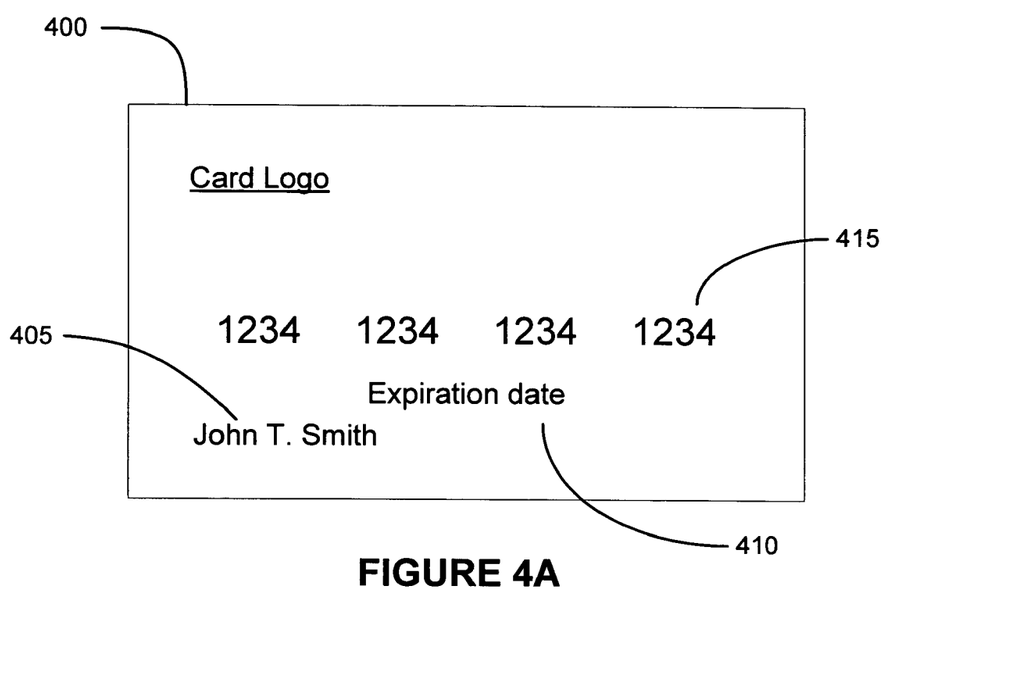
FIGS. 4A and 4B are diagrams illustrating an access card for accessing more than one account.
Figure 4B:
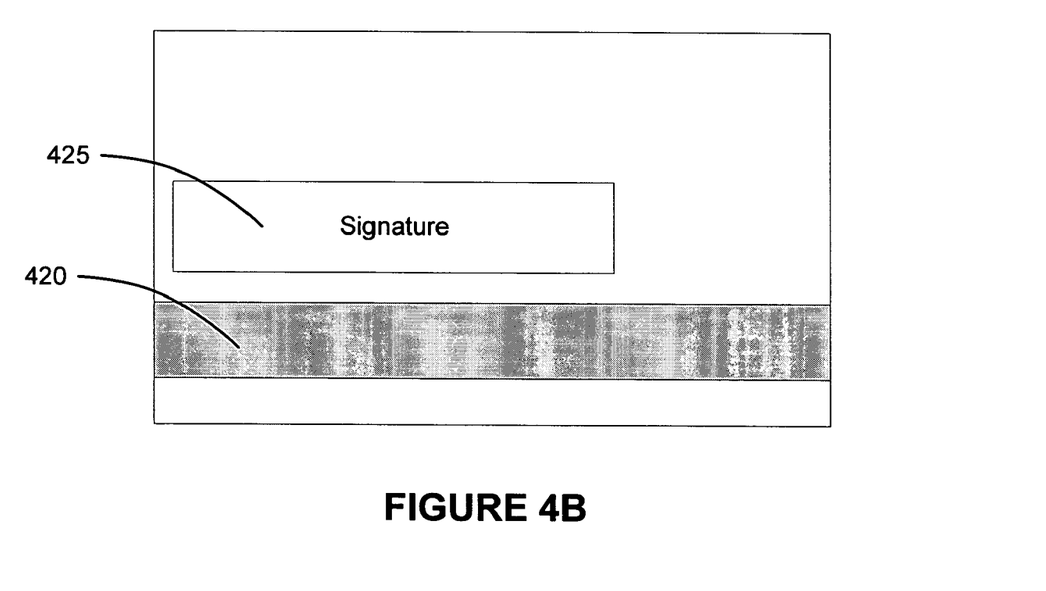

FIGS. 4A and 4B illustrate an access card for accessing more than one account. As shown in FIG. 4A, one side of access card 400 is depicted. Access card 400 may consist of a rectangular shaped substrate and may include name of account owner 405, expiration date 410, and account number 415. As shown in FIG. 4B, an opposite side of access card 400 is depicted. Access card 400 also may include interface device 420 and signature field 425. As noted above, interface device 420 may include a magnetic stripe, RF emitter, and the like.

Account number 415 typically consists of a sixteen digit number. A single digit or a group of digits may correspond to certain information. For example, the first digit may refer to a processing system. In other words, the numbers 3, 4, 5, and 6 may refer to American Express®, Visa®, MasterCard® and Discover®, respectively. The digits corresponding to the account number may vary according to the system being used. For example, if the first digit is the number 4 (i.e., Visa®), digits seven through fifteen may represent the account number. If the first digit is the number 3 (i.e., American Express®), digits five through 11 may represent the account number.

Figure 4C:
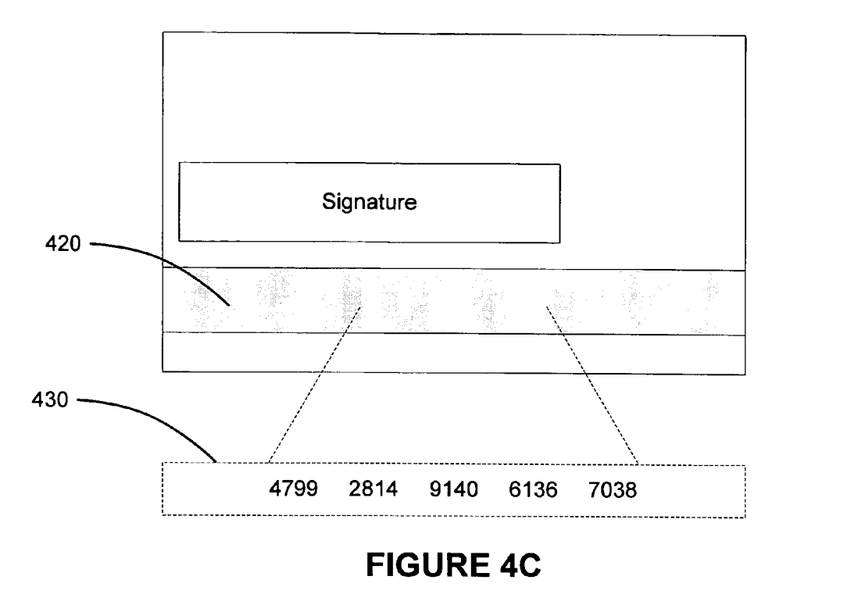
FIG. 4C is a diagram illustrating an implementation of an access card for accessing more than one account.
Figure 4D:
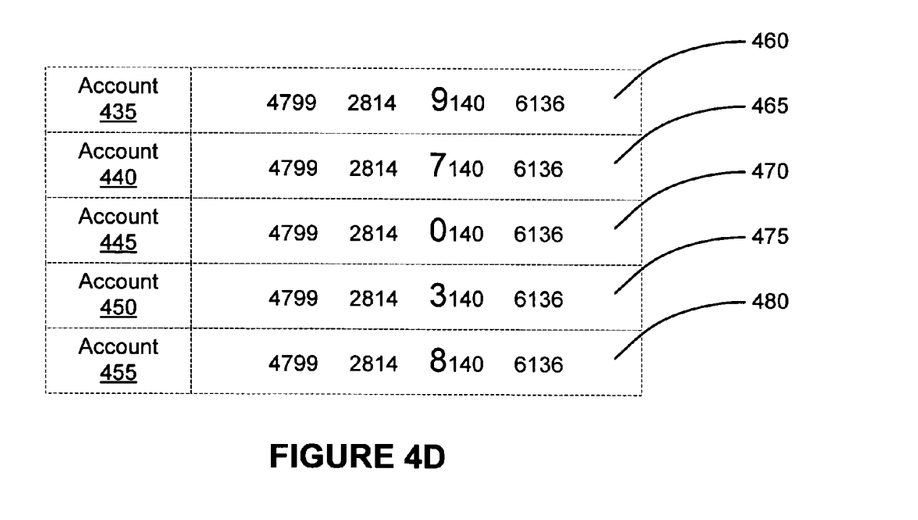
FIG. 4D is a diagram illustrating an example method of mapping a number sequence to accounts stored on an access card.

FIG. 4C illustrates an implementation of access card 400. Access card 400 may include a series of characters (e.g., numbers, letters, symbols, etc.) encoded and/stored on interface device 420. The characters may be associated with more than one account. For example, as shown in FIG. 4C, interface device 420 may store, among other things, information representative of number sequence 430, which may consist of a twenty-digit sequence. The first sixteen digits may correspond to number sequence 460, which may in turn correspond to account 435. Each of the remaining digits of number sequence 430 (i.e., the numbers 7038) may be used to replace the ninth digit of account 435 (i.e., the number 9) to form . . . number sequences 465, 470, 475 and 480, which may correspond to accounts 440, 445, 450 and 455, respectively. For example, number sequence 465 may be identified by replacing the ninth digit of account 435 (i.e., the number 9) with the number 7. Accounts 435, 440, 445, 450 and 455 may represent any type of account, such as a savings account, checking account, credit card account, and the like. FIG. 4D illustrates an example method of mapping number sequence 430 to accounts 435, 440, 445, 450 and 455.

In an embodiment, an account owner may wish to complete a transaction using a specific account stored on access card 400. For example, if the account owner wishes to purchase goods using a credit card account, the account owner may interface access card 400 with a terminal located at the point of sale (e.g., a electronic reader at the merchant's checkout counter). The terminal may read and/or receive the data on access card 400 and identify the multiple accounts using the method outlined in FIG. 4D, for example. The payment terminal may then display the multiple accounts (e.g., by account number, by type of account, by name of account, etc.) and provide the account owner the opportunity to select one of the accounts. Once the account owner has selected the credit card account, the terminal may authenticate the transaction by sending the data associated with the credit card account to a database and/or service provider (e.g., an acquirer) via a communications network. Once the transaction has been authenticated, the terminal may instruct a person (e.g., a cashier) and/or a machine (e.g., a cash register) to complete the transaction.

It will be appreciated that the preceding examples are for purposes of illustration and explanation only, and that an embodiment is not limited to such examples. For example, number sequence 430 may include any number of characters (e.g., numbers, letters, symbols, etc.) and may correspond to any number and/or any type of account. Furthermore, any method of deciphering number sequence 430 to identify multiple accounts is consistent with an embodiment.

Figure 5A:
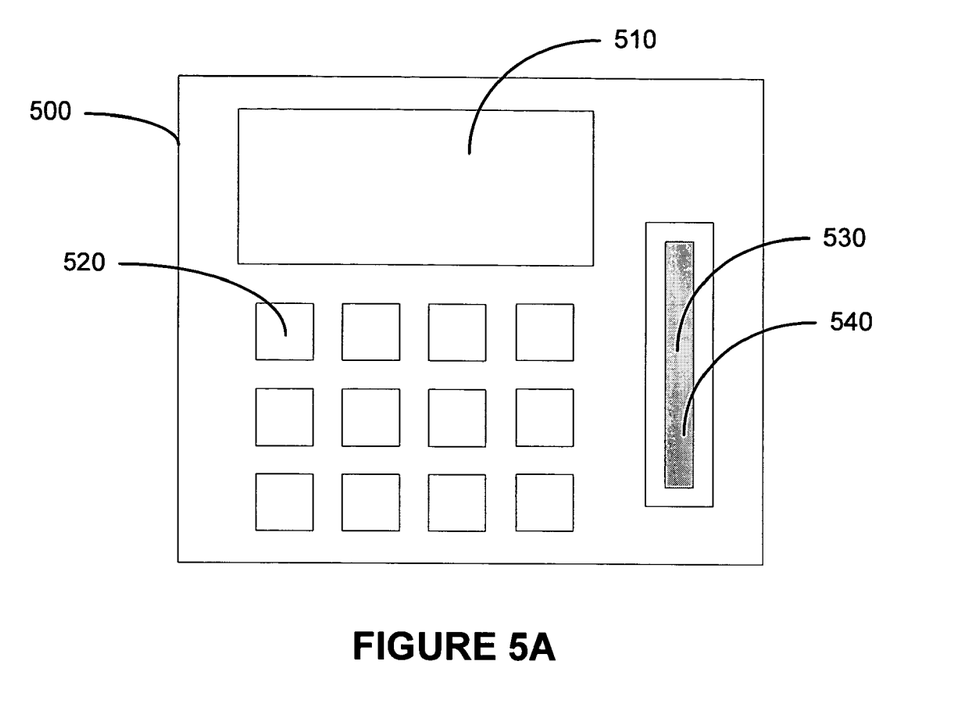
FIGS. 5A and 5B are diagrams illustrating an electronic reader for accessing more than one account.
Figure 5B:
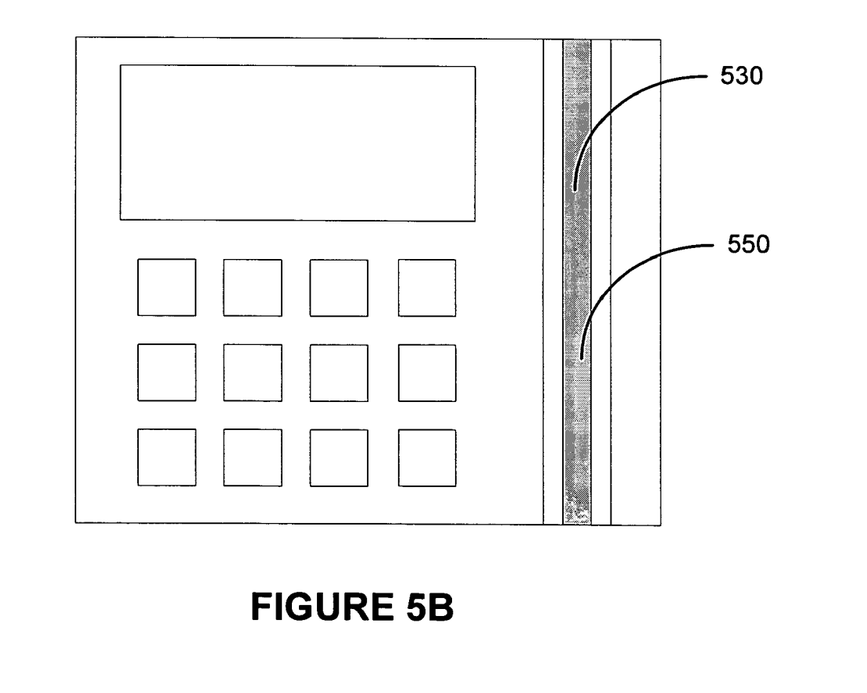

FIGS. 5A and 5B illustrates an electronic reader for accessing more than one account. As shown in FIG. 5A, electronic reader 500 may include display 510, input device 520 and interface component 530. Interface component 530 may include a magnetic stripe reader for reading data encoded on a magnetic stripe located on an access card. In addition, interface component 530 may include a device for receiving data via a RF transmission. Thus, data stored on the access card may be read in a variety of ways. For example, the access card may be read by inserting the card into slot 540, which may house interface component 530. As shown in FIG. 5B, the access card also may be read by swiping the card through slot 550, which may house interface component 530. The access card also may be read by placing the card within a predetermined range of the electronic reader such that the RF transmission may be received.

Electronic reader 500 also may include software instructions (not shown) for deciphering and identifying multiple accounts stored on the access card. The access card may store various types of accounts, such as a savings account, checking account, credit card account, and the like. The software instructions may consist of an algorithm for deciphering an number sequence, which may correspond to multiple accounts stored on the card. FIGS. 4C and 4D illustrate one example in which the data may be deciphered by electronic reader 500.

In one embodiment, an account owner may wish to complete a transaction using a specific account encoded and/or stored on the access card. For example, if the account owner wishes to purchase goods using a credit card account, the account owner may interface the access card with electronic reader 500, which typically is located at the point of sale (e.g., at the merchant's checkout counter). Electronic reader 500 may read the data on the access card and identify the multiple accounts using the method outlined in FIG. 4D, for example. Electronic reader 500 may then display the multiple accounts (e.g., by account number, by type of account, by name of account, etc.) and provide the account owner the opportunity to select one of the accounts. Electronic reader 500 also may request that the account owner input a personal identifier, such as a password, PIN, signature and/or biometric. Once the account owner has selected the credit card account and/or inputted the personal identifier, electronic reader 500 may authenticate the transaction by sending the data associated with the credit card account (e.g., account number, bank number, name of the account owner, expiration date of the card, PIN, etc.) to a database and/or service provider (e.g., an acquirer) via a communications network. Once the transaction has been authenticated, electronic reader 500 may instruct a person (e.g., a cashier) and/or a machine (e.g., a cash register) to complete the transaction.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the processing of the present invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. An electronic reader system for accessing a plurality of accounts from an access card, the system comprising:

An electronic card reader comprising a first electromagnetic interface component for reading a second electromagnetic interface component of the access card, the second electromagnetic interface component storing a first series of characters that map, when decompressed, to a plurality of series of characters corresponding to the plurality of accounts;

a software component of the electronic reader configured to decipher and decompress the first series of characters stored on the second electromagnetic interface component of the access card for determining the plurality of accounts;

an input component of the reader for selecting one of the plurality of accounts; and a processing component of the reader for accessing a database associated with the selected account via a communication network; transmitting a second data associated with the selected account; and completing a transaction with the selected account.

2. The electronic reader system of claim 1, wherein the second interface component comprises at least one of a magnetic stripe or a radio frequency identification (RFID) chip.

3. The electronic reader system of claim 1, wherein the software component comprises an algorithm for deciphering the first series of characters stored on the second interface component of the access card, wherein the algorithm maps a first portion of the first series of characters to each of the plurality of series of characters, and wherein the algorithm maps at least a second portion of the series of characters to only one of the plurality of series of characters.

4. The electronic reader system of claim 1, further comprising an output component for displaying the first series of characters associated with the plurality of accounts.

5. The electronic reader system of claim 1, further comprising a security component for receiving and authenticating a personal identifier.

6. The electronic reader system of claim 5, wherein the personal identifier comprises at least one of a password, a personal identification number (PIN), a signature, or a biometric identifier.

7. The electronic reader system of claim 1, wherein the first series of characters associated with the plurality of accounts comprises at least one an account number, a bank number, a name of an account owner, an expiration date of the access card, or a personal identification number (PIN).

8. A method for accessing a plurality of accounts from an access card using an electronic reader, the method comprising: reading first data associated with the plurality of accounts from an electromagnetic interface component of the access card using the reader, wherein the electromagnetic interface component stores a first series of characters that map, when uncompressed, to a plurality of series of characters corresponding to the plurality of accounts; using the reader for deciphering and decompressing the first series of characters to determine the plurality of accounts stored on the interface component of the access card; using the reader for selecting one of the plurality of accounts; using the reader for accessing a database associated with the selected account via a communications network; transmitting second data associated with the selected account through the reader; and completing a transaction with the selected account.

9. The method of claim 8, wherein the interface component comprises at least one of a magnetic stripe or a radio frequency identification (RFID) chip.

10. The method of claim 8, further comprising determining the plurality of accounts stored on the interface component of the access card via an algorithm, wherein the algorithm maps a first portion of the first series of characters to each of the plurality of series of characters, and wherein the algorithm maps at least a second portion of the series of characters to only one of the plurality of series of characters.

11. The method of claim 8, further comprising displaying the first series of characters associated with the plurality of accounts.

12. The method of claim 8, further comprising receiving and authenticating a personal identifier associated with an account owner.

13. The method of claim 12, further comprising receiving and authenticating at least one of a password, a personal identification number (PIN), a signature, or a biometric identifier.

14. The method of claim 8, wherein the first series of characters comprises at least one of an account number, a bank number, a name of an account owner, an expiration date of the access card, or a personal identification number (PIN).

15. A computer-readable medium comprising computer-readable instructions that when executed access a plurality of accounts from an access card via an electronic reader, the computer-readable medium comprising instructions, that when executed: read first data associated with the plurality of accounts from an electromagnetic interface component of the access card, the first data including a series of characters that map, when uncompressed, to a plurality of series of character corresponding to the plurality of accounts; decompress and decipher the first series of characters to determine the plurality of accounts stored on the electromagnetic interface component of the access card; select one of the plurality of accounts; access a database associated with the selected account via a communications network; transmit second data associated with the selected account; and complete a transaction with the selected account, wherein the instructions are executed by the electronic card reader.

16. The computer-readable medium of claim 15, wherein the interface component comprises at least one of a magnetic stripe or a radio frequency identification (RFID) chip.

17. The computer-readable medium of claim 15, further comprising computer-readable instructions that:
determine the plurality of accounts stored on the interface component of the access card via an algorithm, wherein the algorithm maps a first portion of the first series of characters to each of the plurality of series of characters, and wherein the algorithm maps at least a second portion of the series of characters to only one of the plurality of series of characters.

18. The computer-readable medium of claim 15, further comprising computer-readable instructions that:
display the first series of characters associated with the plurality of accounts via an output component.

19. The computer-readable medium of claim 15, further comprising computer-readable instructions that:
receive and authenticate a personal identifier associated with an account owner.

20. The computer-readable medium of claim 19, further comprising computer-readable instructions that:
receive and authenticate at least one of a password, a personal identification number (PIN), a signature, or a biometric identifier.

* * * * *

UNITED STATES PATENT AND TRADEMARK OFFICE
CERTIFICATE OF CORRECTION

PATENT NO. : 7,784,692 B1  Page 1 of 1
APPLICATION NO. : 11/321974
DATED : August 31, 2010
INVENTOR(S) : Arrington et al.

It is certified that error appears in the above-identified patent and that said Letters Patent is hereby corrected as shown below:

Title Page 2, (56), References Cited, U.S. Patent Documents, delete reference "*6,358,811 B1 3/2002 Kim 705/40" and insert --*6,353,811 B1 3/2002 Weissman 705/40--

Signed and Sealed this

Thirtieth Day of November, 2010

David J. Kappos
*Director of the United States Patent and Trademark Office*